(12) United States Patent
Fan et al.

(10) Patent No.: US 11,348,227 B2
(45) Date of Patent: May 31, 2022

(54) IMAGE REGISTRATION USING A FULLY CONVOLUTIONAL NETWORK

(71) Applicant: The Trustees of the University of Pennsylvania, Philadelphia, PA (US)

(72) Inventors: Yong Fan, Bala Cynwyd, PA (US); Hongming Li, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 85 days.

(21) Appl. No.: 16/560,235

(22) Filed: Sep. 4, 2019

(65) Prior Publication Data

US 2020/0074626 A1    Mar. 5, 2020

Related U.S. Application Data

(60) Provisional application No. 62/726,695, filed on Sep. 4, 2018.

(51) Int. Cl.
*G06T 7/00* (2017.01)
*G06K 9/62* (2022.01)
(Continued)

(52) U.S. Cl.
CPC .......... *G06T 7/0012* (2013.01); *G06K 9/6215* (2013.01); *G06N 3/08* (2013.01); *G06T 7/33* (2017.01); *G06V 10/25* (2022.01); *G06T 2207/10081* (2013.01); *G06T 2207/10088* (2013.01); *G06T 2207/20081* (2013.01)

(58) Field of Classification Search
CPC ....... G06T 7/0012; G06T 7/0014; G06T 7/33; G06T 2207/10081; G06T 2207/10088; G06T 2207/20081; G06T 2207/20084; G06T 2207/30016; G06N 3/08; G06N 3/0454; G06N 3/084; G06N 3/088; G06K 9/3233; G06K 9/6203; G06K 9/6215
See application file for complete search history.

(56) References Cited

U.S. PATENT DOCUMENTS 8,965,487 B2 *    2/2015  Bouma ................ A61B 5/0059
                                                  600/476
10,699,163 B1 *   6/2020  Shah ................... G06K 9/6289
(Continued)

OTHER PUBLICATIONS

WR Crum, T Harkens, DLG Hill, "Non-rigid image registration: Theory and Practice", 2004, The British Journal of Radiology, 77 (2004), S140-S153 (Year: 2004).*
(Continued)

*Primary Examiner* — Emily C Terrell
*Assistant Examiner* — Molly Delaney
(74) *Attorney, Agent, or Firm* — BakerHostetler LLP (57) ABSTRACT

Methods and systems for analyzing images are disclosed. An example method may comprise inputting one or more of a first image or a second image into a fully convolutional network, and determining an updated fully convolutional network by optimizing a similarity metric associated with spatially transforming the first image to match the second image. The one or more values of the fully convolutional network may be adjusted to optimize the similarity metric. The method may comprise registering one or more of the first image or the second image based on the updated fully convolutional network.

19 Claims, 5 Drawing Sheets

(51) Int. Cl.
G06N 3/08 (2006.01)
G06T 7/33 (2017.01)
G06V 10/25 (2022.01)

(56) References Cited

U.S. PATENT DOCUMENTS

| | | | | |
|---|---|---|---|---|
| 10,818,019 | B2* | 10/2020 | Piat | G06K 9/6232 |
| 10,935,773 | B2* | 3/2021 | Johnson | G06K 9/00147 |
| 2013/0266230 | A1* | 10/2013 | Peters | G06T 7/344 |
| | | | | 382/224 |
| 2015/0016728 | A1* | 1/2015 | Parthasarathy | G06T 7/33 |
| | | | | 382/195 |
| 2016/0174945 | A1* | 6/2016 | Oh | A61B 8/4405 |
| | | | | 382/131 |
| 2016/0358314 | A1* | 12/2016 | Ji | H04N 19/167 |
| 2018/0260950 | A1* | 9/2018 | Samset | G06T 7/344 |
| 2019/0139237 | A1* | 5/2019 | Bresch | G06T 7/33 |
| 2019/0205766 | A1* | 7/2019 | Krebs | G06K 9/4628 |
| 2020/0085382 | A1* | 3/2020 | Taerum | G06T 7/30 |

OTHER PUBLICATIONS

V. Vishnevskiy, T. Gass, G. Szekely, C. Tanner, and O. Goksellsotropic, "Total Variation Regularization of Displacements in Parametric Image Registration", IEEE Transactions On Medical Imaging, vol. 36, No. 2, Feb. 2017 pp. 385-395. (Year: 2017).*
T De Silva et al 2016 Phys. Med. Biol. 61 3009 (Year: 2016).*
A. Sotiras, et al., "Deformable Medical Image Registration: A Survey," Ieee Transactions on Medical Imaging, vol. 32, pp. 1153-1190, Jul. 2013.
Aderghal K, Boissenin M, Benois-Pineau J, Catheline G, Afdel K. Classification of sMRI for AD Diagnosis with Convolutional Neuronal Networks: A Pilot 2-D+e Study on ADNI. In: Amsaleg L, Guðmundsson GÞ, Gurrin C, Jónsson BÞ, Satoh Si, editors. MultiMedia Modeling: 23rd International Conference, MMM 2017, Reykjavik, Iceland, Jan. 4-6, 2017, Proceedings, Part I. Cham: Springer International Publishing; 2017. p. 690-701.
Adler DH, Wisse LE, Ittyerah R, Pluta JB, Ding S-L, Xie L, et al. Characterizing the human hippocampus in aging and Alzheimer's disease using a computational atlas derived from ex vivo MRI and histology. Proceedings of the National Academy of Sciences. 2018;115:4252-7.
Aisen PS, Cummings J, Jack CR, Morris JC, Sperling R, Frolich L, et al. On the path to 2025: understanding the Alzheimer's disease continuum. Alzheimers Res Ther. 2017;9.
Albert M, Zhu Y, Moghekar A, Mori S, Miller MI, Soldan A, et al. Predicting progression from normal cognition to mild cognitive impairment for individuals at 5 years. Brain : a journal of neurology. 2018.
Amoroso N, Diacono D, Fanizzi A, La Rocca M, Monaco A, Lombardi A, et al. Deep learning reveals Alzheimer's disease onset in MCI subjects: Results from an international challenge. Journal of neuroscience methods. 2018;302:3-9.
B. B. Avants, et al., "A reproducible evaluation of ANTs similarity metric performance in brain image registration," Neuroimage, vol. 54, pp. 2033-2044, Feb. 1, 2011.
Barandiaran I. The random subspace method for constructing decision forests. IEEE transactions on pattern analysis and machine intelligence. 1998;20.
Barnes DE, Cenzer IS, Yaffe K, Ritchie CS, Lee SJ, Alzheimer's Disease Neuroimaging I. A pointbased tool to predict conversion from mild cognitive impairment to probable Alzheimer's disease. Alzheimer's & dementia : the journal of the Alzheimer's Association. 2014;10:646-55.
Ben Ahmed O, Benois-Pineau J, Allard M, Ben Amar C, Catheline G. Classification of Alzheimer's disease subjects from MRI using hippocampal visual features. Multimedia Tools and Applications. 2015;74:1249-66.

Blanche P, Dartigues JF, Jacqmin-Gadda H. Estimating and comparing time-dependent areas under receiver operating characteristic curves for censored event times with competing risks. Statistics in medicine. 2013;32:5381-97.
Boccardi M, Bocchetta M, Morency FC, Collins DL, Nishikawa M, Ganzola R, et al. Training labels for hippocampal segmentation based on the EADC-ADNI harmonized hippocampal protocol. Alzheimers & Dementia. 2015;11:175-83.
Boyd S, Vandenberghe L. Convex optimization: Cambridge university press; 2004.
Chupin M, Gerardin E, Cuingnet R, Boutet C, Lemieux L, Lehericy S, et al. Fully automatic hippocampus segmentation and classification in Alzheimer's disease and mild cognitive impairment applied on data from ADNI. Hippocampus. 2009;19:579-87.
Costafreda SG, Dinov ID, Tu Z, Shi Y, Liu C-Y, Kloszewska I, et al. Automated hippocampal shape analysis predicts the onset of dementia in mild cognitive impairment. NeuroImage 2011;56:212-9.
Cox DR. Regression models and life-tables. Breakthroughs in statistics: Springer; 1992. p. 527-41.
D. W. Shattuck, et al., "Construction of a 3D probabilistic atlas of human cortical structures," Neuroimage, vol. 39, pp. 1064-1080, Feb. 1, 2008.
Das SR, Pluta J, Mancuso L, Kliot D, Yushkevich PA, Wolk DA. Anterior and posterior MTL networks in aging and MCI. Neurobiology of aging. 2015;36 Suppl 1:S141-50, S50 e1.
Davatzikos C, Fan Y, Wu X, Shen D, Resnick SM. Detection of prodromal Alzheimer's disease via pattern classification of magnetic resonance imaging Neurobiology of aging. 2008;29:514-23.
De Vos F, Schouten TM, Hafkemeijer A, Dopper EG, van Swieten JC, de Rooij M, et al. Combining multiple anatomical MRI measures improves Alzheimer's disease classification Human brain mapping. 2016;37:1920-9.
Desikan RS, Cabral HJ, Settecase F, Hess CP, Dillon WP, Glastonbury CM, et al. Automated MRI measures predict progression to Alzheimer's disease Neurobiology of aging. 2010;31:1364-74.
Devanand DP, Bansal R, Liu J, Hao X, Pradhaban G, Peterson BS. MRI hippocampal and entorhinal cortex mapping in predicting conversion to Alzheimer's disease. NeuroImage. 2012;60:1622-9.
Ellis KA, Bush AI, Darby D, De Fazio D, Foster J, Hudson P, et al. The Australian Imaging, Biomarkers and Lifestyle (AIBL) study of aging: methodology and baseline characteristics of 1112 individuals recruited for a longitudinal study of Alzheimer's disease. International psychogeriatrics. 2009;21:672-87.
Fan Y, Batmanghelich N, Clark CM, Davatzikos C, Initia ADN. Spatial patterns of brain atrophy in MCI patients, identified via high-dimensional pattern classification, predict subsequent cognitive decline. NeuroImage. 2008;39:1731-43.
Fan Y, Resnick SM, Wu XY, Davatzikos C. Structural and functional biomarkers of prodromal Alzheimer's disease: A high-dimensional pattern classification study. NeuroImage. 2008;41:277-85.
Filipovych R, Davatzikos C, Alzheimer's Disease Neuroimaging I. Semi-supervised pattern classification of medical images: application to mild cognitive impairment (MCI). NeuroImage. 2011;55:1109-19.
G. Wu, et al., "Scalable High-Performance Image Registration Framework by Unsupervised Deep Feature Representations Learning," IEEE Trans Biomed Eng, vol. 63, pp. 1505-1516, Jul. 2016.
Gerardin E, Chetelat G, Chupin M, Cuingnet R, Desgranges B, Kim H-S, et al. Multidimensional classification of hippocampal shape features discriminates Alzheimer's disease and mild cognitive impairment from normal aging. NeuroImage. 2009;47:1476-86.
Goodfellow I, Bengio Y, Courville A. Deep Learning: MIT Press; 2016.
Griethuysen JJv, Fedorov A, Parmar C, Hosny A, Aucoin N, Narayan V, et al. Computational Radiomics System to Decode the Radiographic Phenotype. Cancer Research. 2017.
H. Sokooti, et al., "Nonrigid Image Registration Using Multi-Scale 3D Convolutional Neural Networks," in Medical Image Computing and Computer-Assisted Intervention, 2017, 232-239.

(56) References Cited

OTHER PUBLICATIONS

Hao Y, Wang T, Zhang X, Duan Y, Yu C, Jiang T, et al. Local label learning (LLL) for subcortical structure segmentation: Application to hippocampus segmentation. Human brain mapping. 2014;35:2674-97.

Harrell FE, Jr., Lee KL, Mark DB. Multivariable prognostic models: issues in developing models, evaluating assumptions and adequacy, and measuring and reducing errors. Statistics in medicine. 1996;15:361-87.

Harrison TM, Burggren AC, Small GW, Bookheimer SY. Altered memory-related functional connectivity of the anterior and posterior hippocampus in older adults at increased genetic risk for Alzheimer's disease. Human brain mapping. 2016;37:366-80.

He K, Zhang X, Ren S, Sun J. Deep Residual Learning for Image Recognition. 2016 IEEE Conference on Computer Vision and Pattern Recognition (CVPR)2016. p. 770-8.

Heagerty PJ, Lumley T, Pepe MS. Time-dependent ROC curves for censored survival data and a diagnostic marker. Biometrics. 2000;56:337-44.

Hu K, Wang Y, Chen K, Hou L, Zhang X. Multi-scale features extraction from baseline structure MRI for MCI patient classification and AD early diagnosis. Neurocomputing. 2016;175, Part A: 132-45.

I. Yoo, et al., "ssEMnet: Serial-section Electron Microscopy Image Registration using a Spatial Transformer Network with Learned Features," arXiv preprint arXiv:1707.07833, 2017, 8 pages.

Ioffe S, Szegedy C. Batch Normalization: Accelerating Deep Network Training by Reducing Internal Covariate Shift. In: Bach FR, Biei DM, editors. ICML: JMLR.org; 2015. p. 448-56.

Ithapu VK, Singh V, Okonkwo OC, Chappell RJ, Dowling NM, Johnson SC, et al. Imaging-based enrichment criteria using deep learning algorithms for efficient clinical trials in mild cognitive impairment. Alzheimer's & Dementia. 2015;11:1489-99.

J. Krebs, et al., "Robust non-rigid registration through agent-based action learning," in Medical Image Computing and Computer Assisted Interventions (MICCAI), 2017, 344-352.

J. Long, et al., "Fully convolutional networks for semantic segmentation," in Proceedings of the IEEE Conference on Computer Vision and Pattern Recognition, 2015, pp. 3431-3440.

Jack CR, Jr., Bennett DA, Blennow K, Carrillo MC, Dunn B, Haeberlein SB, et al. NIA-AA Research Framework: Toward a biological definition of Alzheimer's disease. Alzheimer's & dementia : the journal of the Alzheimer's Association. 2018;14:535-62.

Jia Y, Shelhamer E, Donahue J, Karayev S, Long J, Girshick R, et al. Caffe: Convolutional architecture for fast feature embedding. Proceedings of the 22nd ACM international conference on Multimedia: ACM; 2014. p. 675-8.

Kang L, Chen W, Petrick NA, Gallas BD. Comparing two correlated C indices with right-censored survival outcome: a one-shot nonparametric approach. Statistics in medicine. 2015;34:685-703.

Khachaturian AS, Corcoran CD, Mayer LS, Zandi PP, Breitner JS, Cache County Study I. Apolipoprotein e ?4 count affects age at onset of alzheimer disease,but not lifetime susceptibility: The cache county study. Archives of General Psychiatry. 2004;61:518-24.

Kong D, Giovanello KS, Wang Y, Lin W, Lee E, Fan Y, et al. Predicting Alzheimer's disease using combined imaging-whole genome SNP data. Journal of Alzheimer's Disease. 2015;46:695-702.

L. Chen-Yu, et al., "Deeply-supervised nets," CoRR, abs/1409.5185, vol. 3, p. 93, 2014.

Langa K, Levine D. The diagnosis and management of mild cognitive impairment: a clinical review. JAMA. 2014;312.

Li F, Tran L, Thung KH, Ji S, Shen D, Li J. A Robust Deep Model for Improved Classification of AD/MCI Patients. IEEE journal of biomedical and health informatics. 2015;19:1610-6.

Li H, Habes M, Fan Y. Deep Ordinal Ranking for Multi-Category Diagnosis of Alzheimer's Disease using Hippocampal MRI data. arXiv: 170901599. 2017.

Li K, O'Brien R, Lutz M, Luo S, Alzheimer's Disease Neuroimaging I. A prognostic model of Alzheimer's disease relying on multiple longitudinal measures and time-to-event data. Alzheimer's & dementia : the journal of the Alzheimer's Association. 2018;14:644-51.

Li S, Okonkwo O, Albert M, Wang M-C. Variation in variables that predict progression from MCI to AD dementia over duration of follow-up. American journal of Alzheimer's disease (Columbia, Mo). 2013;2:12-28.

Li S, Shi F, Pu F, Li X, Jiang T, Xie S, et al. Hippocampal shape analysis of Alzheimer disease based on machine learning methods. AJNR Am J Neuroradiol. 2007;28:1339-45.

M. Abadi, et al., "TensorFlow: A System for Large-Scale Machine Learning.", 12th USENIX Symposium on Operating Systems Design and Implementation, Nov. 2-4, 2016, 265-283.

M. Boccardi, et al., "Training labels for hippocampal segmentation based on the EADC-ADNI harmonized hippocampal protocol," Alzheimers & Dementia, vol. 11, pp. 175-183, Feb. 2015.

M. Jaderberg, et al., "Spatial transformer networks," in Advances in Neural Information Processing Systems, 2015, pp. 2017-2025.

M.-M. Rohe, et al., "SVF-Net: Learning Deformable Image Registration Using Shape Matching," in MICCAI 2017—the 20th International Conference on Medical Image Computing and Computer Assisted Intervention, 2017.

Martin SB, Smith CD, Collins HR, Schmitt FA, Gold BT. Evidence that volume of anterior medial temporal lobe is reduced in seniors destined for mild cognitive impairment. Neurobiology of aging. 2010;31:1099-106.

Misra C, Fan Y, Davatzikos C. Baseline and longitudinal patterns of brain atrophy in MCI patients, and their use in prediction of short-term conversion to AD: Results from ADNI. NeuroImage. 2009;44:1415-22.

Moradi E, Pepe A, Gaser C, Huttunen H, Tohka J, Alzheimer's Disease Neuroimaging I. Machine learning framework for early MRI-based Alzheimer's conversion prediction in MCI subjects. NeuroImage. 2015;104:398-412.

Rathore S, Habes M, Iftikhar MA, Shacklett A, Davatzikos C. A reviewon neuroimaging-based classification studies and associated feature extraction methods for Alzheimer's disease and its prodromal stages. NeuroImage. 2017; 155:530-48.

Royston P. Estimating a smooth baseline hazard function for the Cox model. London: Department of Statistical Science, University College London. 2011.

Sorensen L, Igel C, Liv Hansen N, Osler M, Lauritzen M, Rostrup E, et al. Eady detection of Alzheimer's disease using MRI hippocampal texture. Human brain mapping. 2016;37:1148-61.

Suk HI, Lee SW, Shen D, Alzheimer's Disease Neuroimaging I. Hierarchical feature representation and multimodal fusion with deep learning for AD/MCI diagnosis. NeuroImage. 2014;101:569-82.

Tibshirani R. The lasso method for variable selection in the Cox model. Statistics in medicine. 1997;16:385-95.

Tsao S, Gajawelli N, Zhou J, Shi J, Ye J, Wang Y, et al. Feature selective temporal prediction of Alzheimer's disease progression using hippocampus surface morphometry. Brain and behavior. 2017;7:e00733.

V. Vishnevskiy, et al., "Isotropic Total Variation Regularization of Displacements in Parametric Image Registration," IEEE Trans Med Imaging, vol. 36, pp. 385-395, Feb. 2017.

Weiner MW, Veitch DP, Aisen PS, Beckett LA, Cairns NJ, Cedarbaum J, et al. 2014 Update of the Alzheimer's Disease Neuroimaging Initiative: A review of papers published since its inception. Alzheimer's & dementia : the journal of the Alzheimer's Association. 2015;11:e1-120.

Weiner MW, Veitch DP, Aisen PS, Beckett LA, Cairns NJ, Green RC, et al. Recent publications from the Alzheimer's Disease Neuroimaging Initiative: Reviewing progress toward improved AD clinical trials. Alzheimer's & dementia : the journal of the Alzheimer's Association. 2017;13:e1-e85.

Weiner MW, Veitch DP, Aisen PS, Beckett LA, Cairns NJ, Green RC, et al. The Alzheimer's Disease Neuroimaging Initiative 3: Continued innovation for clinical trial improvement. Alzheimer's & dementia : the journal of the Alzheimer's Association. 2017;13:561-71.

West MJ, Coleman PD, Flood DG, Troncoso JC. Differences in the pattern of hippocampal neuronal loss in normal ageing and Alzheimer's disease. Lancet. 1994;344:769-72.

(56) References Cited

OTHER PUBLICATIONS

Wolk DA, Sadowsky C, Safirstein B, et al. Use of flutemetamol f 18-labeled positron emission tomography and other biomarkers to assess risk of clinical progression in patients with amnestic mild cognitive impairment. JAMA Neurology. 2018.

X. Yang, et al., "Quicksilver: Fast predictive image registration—A deep learning approach," Neuroimage, vol. 158, pp. 378-396, Jul. 11, 2017.

Zhou B, Khosla A, Lapedriza A, Oliva A, Torralba A. Learning deep features for discriminative localization. Proceedings of the IEEE Conference on Computer Vision and Pattern Recognition2016. p. 2921-9.

Hongming et al., Brain Age Prediction Based On Resting-State Functional Connectivity Patterns Using Convolutional Neural Networks, 2018 IEEE International Symposium on Biomedical Imaging Apr. 4-7, 2018, Washington, DC, USA.

\* cited by examiner

IMAGE REGISTRATION USING A FULLY CONVOLUTIONAL NETWORK

CROSS-REFERENCE TO RELATED APPLICATIONS

This application claims the benefit of U.S. Provisional Patent Application No. 62/726,695 filed Sep. 4, 2018, which is hereby incorporated by reference for any and all purposes.

GOVERNMENT SUPPORT CLAUSE

This invention was made with government support under EB022573 awarded by the National Institute of Health. The government has certain rights in the invention.

BACKGROUND

Medical image registration is important for both clinical image alignment and research that uses medical images from multiple subjects/patients. Conventional medical image registration can be time consuming and challenging for certain types of images. Therefore, more recent methods use deep learning techniques, which involve training datasets to improve the speed and accuracy of registration. However, training datasets are often unavailable or do not accurately represent the image at hand. Accordingly, there is a long-felt need in the art for improved image registration methods and systems.

SUMMARY

In meeting the described long-felt needs, the present disclosure provides methods and systems for analyzing images. An example method may comprise inputting one or more of a first image or a second image into a fully convolutional network, and determining an updated fully convolutional network by optimizing a similarity metric associated with spatially transforming the first image to match the second image. The one or more values of the fully convolutional network may be adjusted to optimize the similarity metric. The method may comprise registering one or more of the first image or the second image based on the updated fully convolutional network.

An example system may comprise a scanning device configured to generate a first image of an object of interest. The system may comprise a computing device configured to receive the first image, input one or more of the first image or a second image into a fully convolutional network, and determine an updated fully convolutional network by optimizing a similarity metric associated with spatially transforming the first image to match the second image. The one or more values of the fully convolutional network are adjusted to optimize the similarity metric. The computing device may be configured to register one or more of the first image or the second image based on the updated fully convolutional network.

An example device may comprise one or more processors, and memory storing instructions that, when executed by the one or more processors, cause the device to input one or more of a first image or a second image into a fully convolutional network, and determine an updated fully convolutional network by optimizing a similarity metric associated with spatially transforming the first image to match the second image. The one or more values of the fully convolutional network may be adjusted to optimize the similarity metric. The instructions may further cause the device to register one or more of the first image or the second image based on the updated fully convolutional network.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

The present disclosure is directed to a novel non-rigid image registration algorithm that is built upon fully convolutional networks (FCNs) to optimize and learn spatial transformations between pairs of images to be registered in a self-supervised learning framework. Different from most existing deep learning based image registration methods that learn spatial transformations from training data with known corresponding spatial transformations, the disclosed method may directly estimate spatial transformations between pairs of images by maximizing an image-wise similarity metric between fixed and deformed moving images, similar to conventional image registration algorithms. The image registration may be implemented in a multi-resolution image registration framework to jointly optimize and learn spatial transformations and FCNs at different spatial resolutions with deep self-supervision through typical feedforward and backpropagation computation. The proposed method has been evaluated for registering 3D structural brain magnetic resonance (MR) images and obtained better performance than state-of-the-art image registration algorithms.

Medical image registration is typically formulated as an optimization problem to seek a spatial transformation that establishes pixel/voxel correspondence between a pair of fixed and moving images [1]. Recently, deep learning techniques have been used to build prediction models of spatial transformations for image registration under a supervised learning framework [2-4], besides learning image features for image registration using stacked autoencoders [5]. The prediction models are designed to predict spatial relationship between image pixel/voxels from a pair of images based on their image patches. The learned prediction model can then be applied to images pixel/voxel-wisely to achieve an overall image registration.

The prediction based image registration algorithms typically adopt convolutional neural networks (CNNs) to learn informative image features and a mapping between the learned image features and spatial transformations that register images in a training dataset [2-4]. Similar to most deep learning tasks, the quality of training data plays an important role in the prediction based image registration, and a variety of strategies have been proposed to build training data, specifically the spatial transformations [2-4]. However, a prediction based image registration model built upon such training datasets is limited to estimating spatial transformations captured by the train datasets themselves.

Inspired by spatial transformer network (STN) [6], deep CNNs in conjunction with STNs have been proposed recently to learn prediction models for image registration in an unsupervised fashion [7, 8]. In particular, DirNet learns CNNs by optimizing an image similarity metric between fixed and transformed moving images to estimate 2D control points of cubic B-splines for representing spatial transformations [7]. Also, ssEMnet estimates coarse-grained deformation fields at a low spatial resolution and uses bilinear interpolation to obtain dense spatial transformations for registering 2D images by optimizing an image similarity metric between feature maps of the fixed and transformed moving images [8]. However, the coarse-grained spatial transformation measures may fail to characterize fine-grained deformations between images.

Building upon fully convolutional networks (FCNs) that facilitate voxel-to-voxel learning [9], the present disclosure describes a novel deep learning based non-rigid image registration framework to learn spatial transformations between pairs of images to be registered. Different from most learning based registration methods that rely on training data, our method directly trains FCNs to estimate voxel-to-voxel spatial transformations for registering images by maximizing their image-wise similarity metric. To account for potential large deformations between images, a multi-resolution strategy is adopted to jointly learn spatial transformations at different spatial resolutions. The image similarity measures between the fixed and deformed moving images are evaluated at different image resolutions to serve as deep self-supervision. The disclosed methods may simultaneously optimize and learn spatial transformations for the image registration in an unsupervised fashion. The registration of pairs of images may also serve as a training procedure. The trained FCNs can be directly adopted to register new images using feedforward computation. As described further herein, an example disclosed method has been evaluated based on 3D structural MRI brain images.

Figure 1:
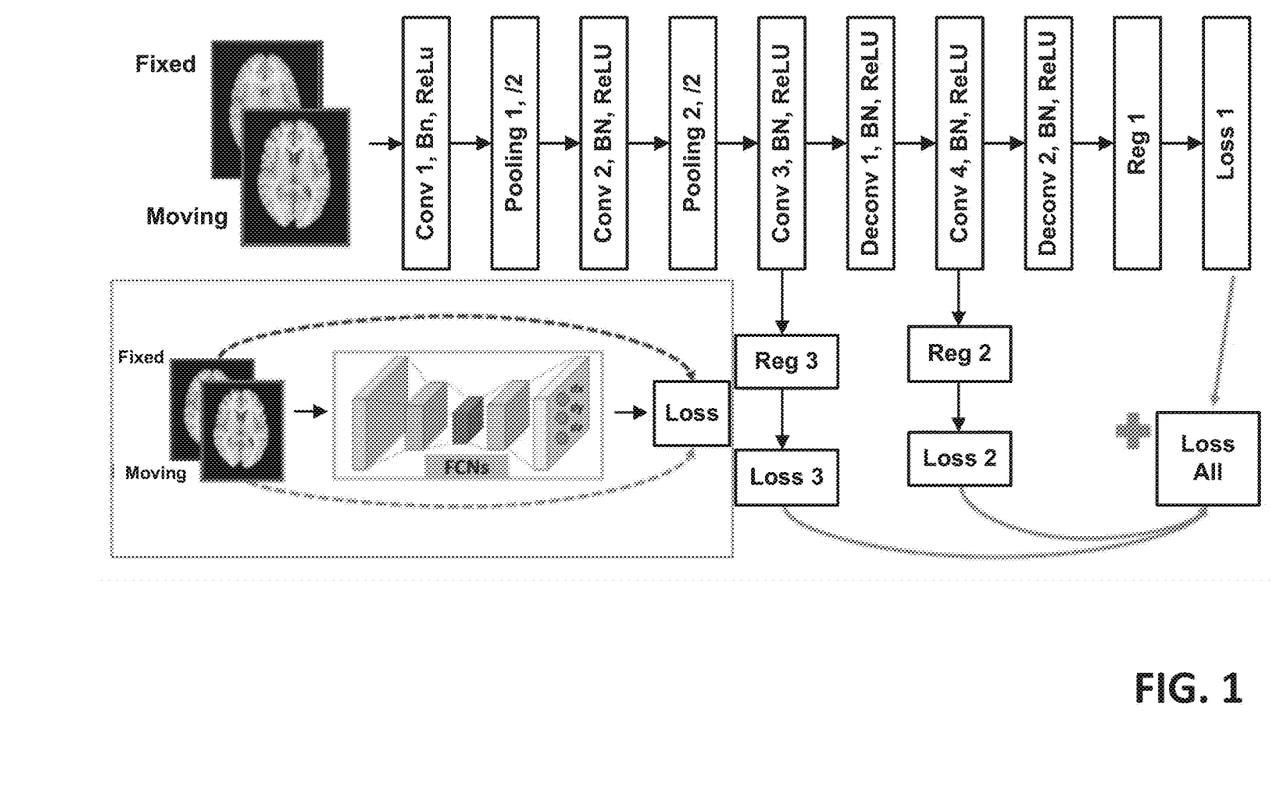
FIG. 1 shows an overall architecture of an example image registration framework.

FIG. 1 shows an example image registration framework using example FCNs. The framework and/or FCNs may be configured for voxel-to-voxel regression of deformation fields in a multi-resolution image registration framework.

Given a pair of fixed image If and moving image Im, the task of image registration is to seek a spatial transformation that establishes pixel/voxel-wise spatial correspondence between the two images. Since the spatial correspondence can be gauged with a surrogate measure, such as an image intensity similarity, the image registration task can be formulated as an optimization problem to identify a spatial transformation that maximizes the image similarity measure between the fixed image and transformed moving image. For non-rigid image registration, the spatial transformation is often characterized by a dense deformation field Dv that encodes displacement vectors between spatial coordinates of If and their counterparts of Im.

Regularization techniques are usually adopted in image registration algorithms to obtain spatially smooth and physically plausible spatial transformations [1]. As an example, a total variation based regularizer [10] may be used as follows:

$$R(D_v) = \Sigma_{n=1}^{N} \|\nabla D_v(n)\|_1 \qquad \text{Eq. (1)}$$

where N is the number of pixel/voxels in the deformation field. In general, the image registration problem is formulated as $$\min_{D_v} -S(I_f(v), I_m(D_v \circ v)) + \lambda R(D_v) \qquad \text{Eq. (2)}$$

where v represents spatial coordinates of pixel/voxels in If, $D_v \circ v$ represents deformed spatial coordinates of pixel/voxels by $D_v$ in $I_m$, $S(I_1, I_2)$ is an image similarity measure, R(D) is a regularizer on the deformation field, and λ controls the trade-off between the image similarity measure and the regularization term.

To solve the image registration optimization problem, disclosed is a deep learning model using FCNs to learn informative image feature representations and a mapping between the feature representations and the spatial transformation between images at the same time. The registration framework of an example disclosed method is illustrated by FIG. 1 (bottom left). In particular, each pair of fixed and moving images may be concatenated as an input with two channels to the deep learning model for learning spatial transformations that optimize image similarity measures between the fixed and transformed moving images. The deep learning model may comprise one or more FCNs with de/convolutional (Conv) layers, batch normalization (BN) layers, activation (ReLU) layers, pooling layers, and multi-output regression layers. Particularly, each of the regression layer (Reg) may be implemented as a convolutional layer whose output has the same size of the input images in the spatial domain and multiple channels for encoding displacements in different spatial dimensions of the input images.

A pooling operation may be adopted in CNNs to obtain translation-invariant features and increase reception fields of the CNNs, as well as to decrease the spatial size of the CNNs to reduce the computational cost. However, the multi-output regression layers after pooling operations produce coarse outputs which may be interpolated to generate deformation fields at the same spatial resolution of the input images [7, 8]. An alternative way to obtain fine-grained deformation fields is to stack multiple convolutional layers without any pooling layers. However, such a network architecture would have more parameters to be learned and decrease the efficiency of the whole network. A deconvolutional operators may be used for upsampling [9], instead of choosing a specific interpolation scheme, such as cubic spline and bilinear interpolation [7, 8]. The example architecture may lead to a multi-resolution image registration.

As an example, normalized cross-correlation (NCC) may be used as the image similarity metric between images, and the total variation based regularizer as formulated by Eq. (1) may be adopted to regularize the deformation fields. Therefore, the loss layer may evaluate the registration loss between the fixed and deformed moving images as formulated by Eq. (2).

An example multi-resolution image registration method may be based upon FCNs with deep self-supervision, as illustrated by FIG. 1 (top right). Particularly, the first 2 pooling layers in conjunction with their preceding convolutional layers may progressively reduce the spatial size of the convolutional networks so that informative image features can be learned by the 3rd convolutional layer to predict voxel-wise displacement at the same spatial resolution of downsampled input images. And the subsequent deconvolutional layers learn informative image features for predicting spatial transformations at higher spatial resolutions.

Similar to conventional multi-resolution image registration algorithms, the similarity of registered images at different resolutions may be maximized in our network to serve as deep supervision [11], but without the need of supervised deformation field information. Such a supervised learning with surrogate supervised information may be referred to as self-supervision as disclosed herein.

Different from conventional multi-resolution image registration algorithms in which deformation fields at lower-resolutions are typically used as initialization inputs to image registration at a higher spatial resolution, the disclosed example deep learning based method may jointly optimize deformation fields at all spatial resolutions with a typical feedforward and backpropagation based deep learning setting. As the optimization of the loss function proceeds, the parameters within the network may be updated through the feedforward computation and backpropagation procedure, leading to improved prediction of deformation fields. It is worth noting that no training deformation field information is needed for the optimization, and self-supervision through maximizing image similarity with smoothness regularization of deformation fields may be the only force to drive the optimization. The trained network can be directly used to register a pair of images, and any of them can be the fixed image.

Network training is described as follows. Given a set of n images, (n−1) pairs of fixed and moving images may be obtained, such that every image can serve as a fixed image. Pairs of images may be registered using following parameters. As a non-limiting example illustrated in FIG. 1, 32, 64, 128, and 64 kernels are used for Conv layer 1, 2, 3, and 4 respectively, with kernel size 3 and stride 2. For pooling layers, kernel size is set to 3, and stride 2. 64 and 32 kernels are used for Deconv layer 1 and 2 respectively, with kernel size 3 and stride 2. Three kernels are used in the regression layers 1, 2 and 3 to obtain 3D deformation fields. The total loss is calculated as a weighted sum of loss of the 3 loss layers, with weight coefficients 1, 0.6, and 0.3 assigned to the loss layers 1, 2, and 3 respectively. It should be understood that a variety of other values may be used.

An example alternative network architecture without pooling layers may be implemented for performance comparison. Particularly, Conv layers 1 to 3, one regression layer, and one loss layer may be kept. The Conv layers may have the same parameters as described above. Moreover, alternative network architecture with pooling layers and additional one interpolation layer may also be implemented as an image registration model with coarse-grained spatial transformation, and tri-linear interpolation is adopted to upsample the coarse-grained deformation fields to the original spatial resolution.

The registration models may be built using Tensorflow [12]. Adam optimization technique may be adopted to train the networks, with learning rate set to 0.001. The networks may be trained on one Nvidia Titan Xp GPU with 10000 iteration steps. The trained FCNs could be directly used to register new images with feedforward computation.

Results for the proposed examples above are described as follows. The 1st dataset used in this study was obtained from the Alzheimer's Disease Neuroimaging Initiative (ADNI) database (http://adni.loni.usc.edu). In particular, baseline MRI data of 959 subjects were obtained from the ADNI Go & 2. T1-weighted MRI scans of all the subjects were registered to the MNI space using affine registration, and then a 3D bounding box of size 32×48×48 was adopted to extract hippocampus regions for each subject, as similarly did in a hippocampus segmentation study [13]. In addition, 100 T1 images with hippocampus segmentation labels were obtained from a preliminary release of the EADC-ADNI harmonized segmentation protocol project [14]. These images with hippocampus labels were used to evaluate image registration performance based on an overlapping metric between the hippocampus labels of registered images.

The 2nd dataset used was LPBA40 in delineation space [15]. The LPBA40 consists of 40 T1-weighted MRI brain images and their label images, each with 56 brain regions. All of these MRI brain images were registered to MNI152 space at a spatial resolution of 2×2×2 mm3 after the image intensity was normalized using histogram matching, and their label images were transformed to MNI152 space accordingly. These MRI images with their labels (excluding cerebellum and brainstem) were used to evaluate image registration performance based on an overlapping metric between the labels of registered images.

The disclosed method was compared with ANTs [16] based on the same datasets.

For the ADNI dataset, the deep learning based image registration models were trained based the ADNI GO & 2 dataset, and evaluated based on the EADC-ADNI dataset. The model was trained with a batch size of 64.

To compare our method with ANTs, one image was randomly selected from the EADC-ADNI dataset as the fixed image, and all other images were registered to the selected image. For the disclosed method, trained deep learning model was used to register these images. The deformation fields obtained were applied to register their corresponding hippocampus labels. The overlapping between the fixed and registered moving images was measured using Dice index.

The Dice index values of the hippocampus labels between images before and after registration by ANTs and our method were 0.654±0.062, 0.762±0.057, and 0.798±0.033, respectively. These results indicate that the disclosed methods identify better spatial correspondence between images. Moreover, it took ~1 minute to register two images by ANTs on one CPU (AMD Opteron 4184 @ 2.80 Ghz), while only ~50 ms by our model on one Titan Xp GPU.

The disclosed method was further compared to ANTs using the LPBA40 dataset. In particular, the disclosed deep learning based image registration model was trained based on 30 images, and the remaining 10 images were used as the testing images. In the training phrase, image pairs were randomly selected from 30 training images, and the batch size was set to 8. In the testing phrase, each testing image was used as the fixed image, and all the other 9 testing images were registered to it using the trained deep learning model. The ANTs algorithm was applied directly to register the testing images in the same manner, with the same ANTs command as described above. The overlap between deformed label and ground truth label for 54 regions of the testing images were calculated to evaluate the registration performance.

Figure 2A:
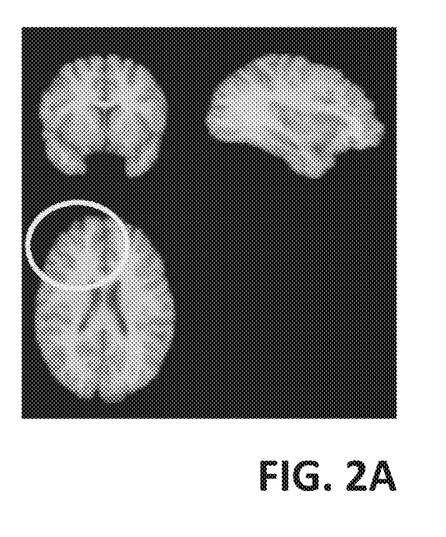
FIG. 2A shows an example fixed image.
Figure 2B:
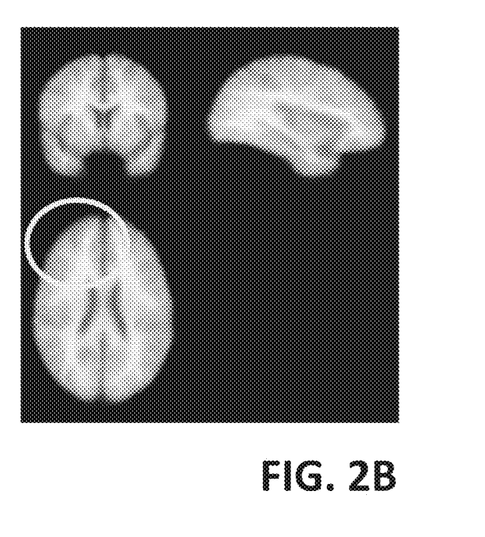
FIG. 2B shows an example mean of images before registration.
Figure 2C:
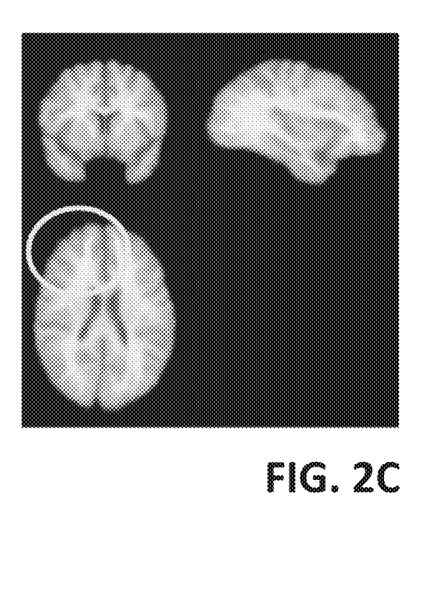
FIG. 2C shows an example mean of registered images by ANTs.
Figure 2D:
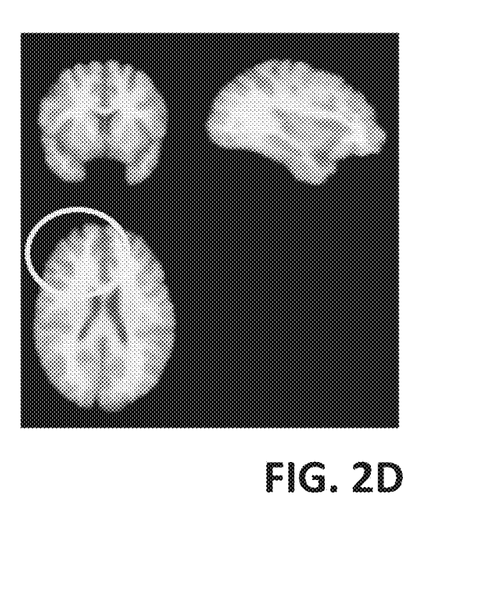
FIG. 2D shows an example mean of registered images based on the disclosed methods and systems.

FIGS. 2A-D show mean brain image before and after registration by different methods. FIG. 2A shows an example fixed image. FIG. 2B shows an example mean of images before registration. FIG. 2C shows an example mean of registered images by ANTs. FIG. 2D shows an example mean of registered images based on the disclosed methods and systems.

As shown in FIG. 2B, the mean of images before registration is blurry. The means of registered images in FIGS. 2C and 2D maintain detailed image textures, and the one obtained by the proposed method has sharper contrast than that obtained by ANTs visually.

Figure 3A:
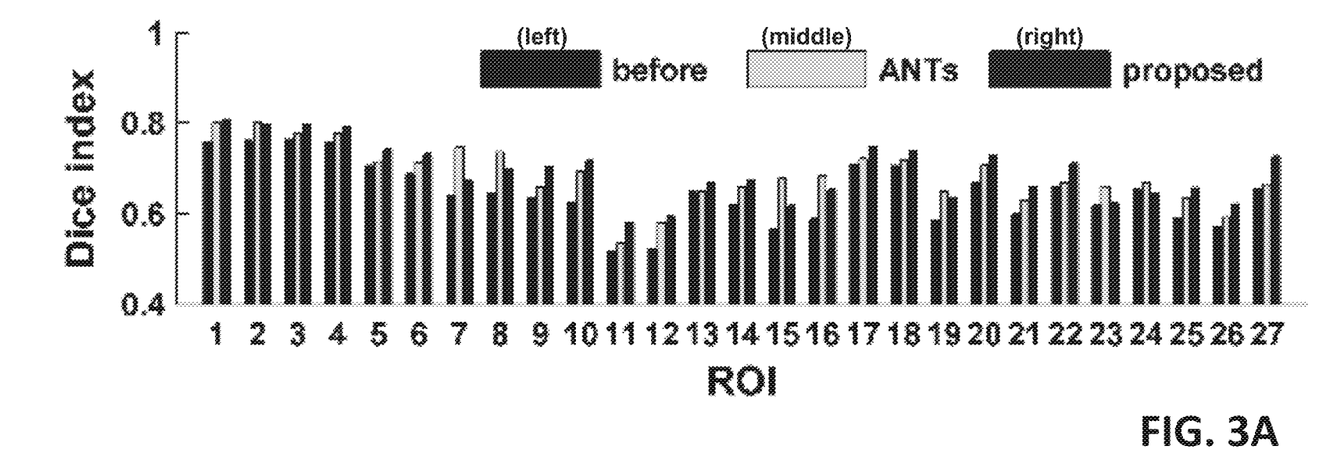
FIG. 3A is a graph showing part of a dataset of regions of interest.
Figure 3B:
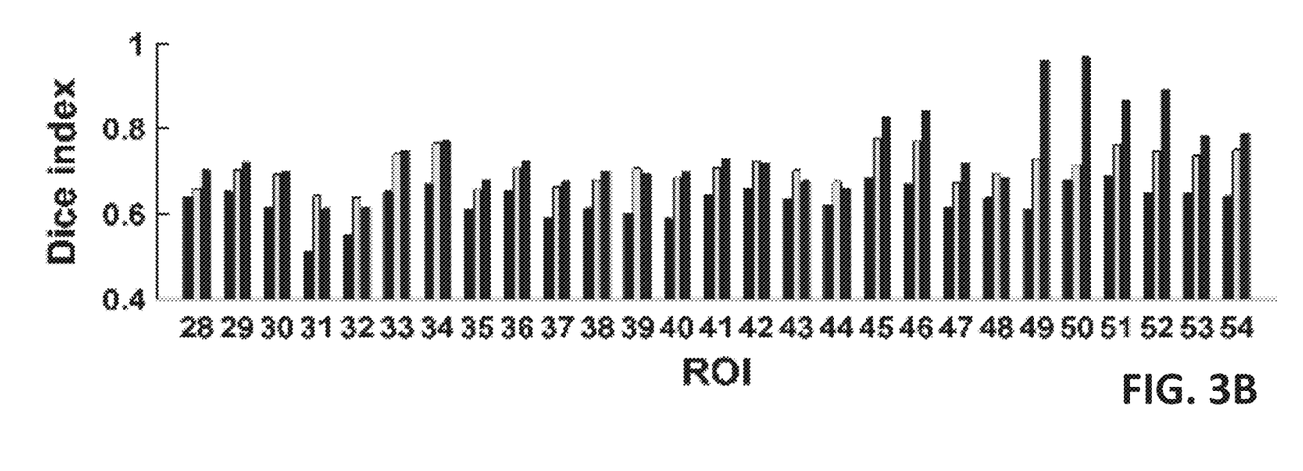
FIG. 3B is a graph showing another part of a dataset of regions of interest.

FIG. 3A-B show a dice index for 54 ROIs between all testing image pairs from the LPBA40 dataset before and after registration using ANTs and the proposed method. The mean Dice index values of all the testing images for the 54 regions of interest (ROIs) are illustrated in FIG. 3A-B. For each group of three bars, the left bar shows the dice index value for data before processing, the middle bar shows the dice index value for the data processed using ANTs, and the right bar shows the dice index value for the data processed by the disclosed approach. The Dice index values after registration were significantly higher than that before registration. For 35 out of 54 ROIs, their Dice index values obtained by our method were significantly higher than those obtained by the ANTs. No optimization was performed by the disclosed example method for registering the testing images, and it took ~200 ms to register a pair of images.

The experimental results based on 3D structural MR images have demonstrated that the disclosed method can obtain promising image registration performance with respect to both image registration accuracy and computational speed.

Figure 4:
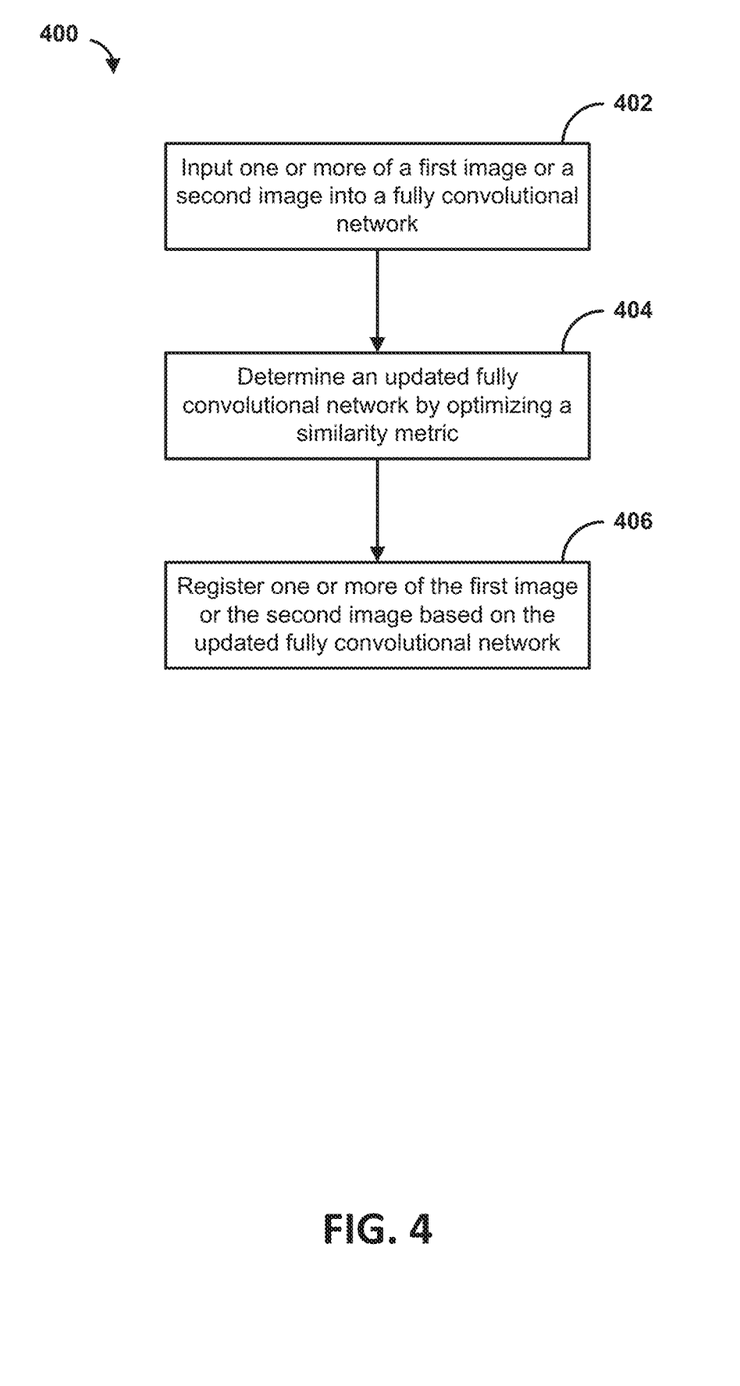
FIG. 4 is a flowchart showing an example method for analyzing images.

FIG. 4 is a flow chart showing an example method for analyzing an image. At step 402, one or more of a first image or a second image may be input into a fully convolutional network. The first image may be based on a first imaging modality and the second image may be based on a second imaging modality different than the first imaging modality. The first image may comprise a magnetic resonance imaging (MRI) scan image and the second image comprises a computed tomography (CT) scan image.

The first image may represent a first object of interest and the second image represents a second object of interest. The first object of interest may be associated with a first patient and the second object of interest may be associated with a second patient. The first image may represent a first object of interest associated with a first time and the second image may represent the first object of interest associated with a second time different than the first time.

The fully convolutional network may be configured to apply a displacement field for registering the first image and the second image on one or more of a voxel-by-voxel or a pixel-by-pixel basis. The fully convolutional network may comprise a plurality of layers applying operations to one or more of the first image or the second image, and wherein the plurality of layers may comprise one or more of a convolution layer, a deconvolution layer, a pooling layer, a normalization layer, an activation layer, or a multi-output regression layer. The fully convolutional network may not be trained with training data before inputting one or more of the first image or the second image into the fully convolutional network.

At step 404, an updated fully convolutional network may be determined. The updated fully convolution network may be determined by optimizing a similarity metric associated with spatially transforming the first image to match the second image. One or more values of the fully convolutional network may be adjusted to optimize the similarity metric. The one or more values of the fully convolutional network may comprise one or more of a kernel size or a stride of one or more layers of the fully convolutional network. Determining the updated fully convolutional network by optimizing the similarity metric associated with spatially transforming the first image to match the second image may comprise using a self-supervision process in which a processor uses an algorithm to adjust the one or more values of the fully convolutional network until a value of the similarity metric reaches a threshold value.

At step 406, one or more of the first image or the second image may be registered based on the updated fully convolutional network. Registering one or more of first image or the second image based on the updated fully convolutional network may comprise spatially transforming the first image to at least partially match the second image.

The method 400 may further comprises determining a further updated fully convolutional network by further optimizing the similarity metric based on matching a third image to one or more of the first image, the second image, or a fourth image.

The present disclosure may be directed to any of the following aspects.

Aspect 1. A method, comprising, consisting of, or consisting essentially of: inputting one or more of a first image or a second image into a fully convolutional network; determining an updated fully convolutional network by optimizing a similarity metric associated with spatially transforming the first image to match the second image, wherein one or more values of the fully convolutional network are adjusted to optimize the similarity metric; and registering one or more of the first image or the second image based on the updated fully convolutional network.

Aspect 2. The method of Aspect 1, wherein the fully convolutional network is configured to apply a displacement field for registering the first image and the second image on one or more of a voxel-by-voxel or a pixel-by-pixel basis.

Aspect 3. The method of any one of claims 1-2, wherein the first image is based on a first imaging modality and the second image is based on a second imaging modality different than the first imaging modality.

Aspect 4. The method of any one of Aspects 1-3, wherein the first image comprises a magnetic resonance imaging (MRI) scan image and the second image comprises a computed tomography (CT) scan image.

Aspect 5. The method of any one of Aspects 1-4, wherein the first image represents a first object of interest and the second image represents a second object of interest.

Aspect 6. The method of Aspect 5, wherein the first object of interest is associated with a first patient and the second object of interest is associated with a second patient.

Aspect 7. The method of any one of Aspects 1-6, wherein the first image represents a first object of interest associated with a first time and the second image represents the first object of interest associated with a second time different than the first time.

Aspect 8. The method of any one of Aspects 1-7, wherein registering one or more of first image or the second image based on the updated fully convolutional network comprises spatially transforming the first image to at least partially match the second image.

Aspect 9. The method of any one of Aspects 1-8, wherein the one or more values of the fully convolutional network comprise one or more of a kernel size or a stride of one or more layers of the fully convolutional network.

Aspect 10. The method of any one of Aspects 1-9, wherein the fully convolutional network comprises a plurality of layers applying operations to one or more of the first image or the second image, and wherein the plurality of layers comprises one or more of a convolution layer, a deconvolution layer, a pooling layer, a normalization layer, an activation layer, or a multi-output regression layer.

Aspect 11. The method of any one of Aspects 1-10, wherein the fully convolutional network is not trained with training data before inputting one or more of the first image or the second image into the fully convolutional network.

Aspect 12. The method of any one of Aspects 1-11, further comprising: determining a further updated fully convolutional network by further optimizing the similarity metric based on matching a third image to one or more of the first image, the second image, or a fourth image.

Aspect 13. The method of any one of Aspects 1-12, wherein determining the updated fully convolutional network by optimizing the similarity metric associated with spatially transforming the first image to match the second image comprises using a self-supervision process in which a processor uses an algorithm to adjust the one or more values of the fully convolutional network until a value of the similarity metric reaches a threshold value.

Aspect 14. A system, comprising, consisting of, or consisting essentially of: a scanning device configured to generate a first image of an object of interest; and a computing device configured to: receive the first image; input one or more of the first image or a second image into a fully convolutional network; determine an updated fully convolutional network by optimizing a similarity metric associated with spatially transforming the first image to match the second image, wherein one or more values of the fully convolutional network are adjusted to optimize the similarity metric; and register one or more of the first image or the second image based on the updated fully convolutional network.

Aspect 15. The system of Aspect 14, wherein the fully convolutional network is configured to apply a displacement field for registering the first image and the second image on one or more of a voxel-by-voxel or a pixel-by-pixel basis.

Aspect 16. The system of any one of Aspects 14-15, wherein the first image is based on a first imaging modality and the second image is based on a second imaging modality different than the first imaging modality.

Aspect 17. The system of any one of Aspects 14-16, wherein the first image comprises a magnetic resonance imaging (MRI) scan image and the second image comprises a computed tomography (CT) scan image.

Aspect 18. The system of any one of Aspects 14-17, wherein the first image represents a first object of interest and the second image represents a second object of interest.

Aspect 19. The system of Aspect 18, wherein the first object of interest is associated with a first patient and the second object of interest is associated with a second patient.

Aspect 20. The system of any one of Aspects 14-19, wherein the first image represents a first object of interest associated with a first time and the second image represents the first object of interest associated with a second time different than the first time.

Aspect 21. The system of any one of Aspects 14-20, wherein registering one or more of first image or the second image based on the updated fully convolutional network comprises spatially transforming the first image to at least partially match the second image.

Aspect 22. The system of any one of Aspects 14-21, wherein the one or more values of the fully convolutional network comprise one or more of a kernel size or a stride of one or more layers of the fully convolutional network.

Aspect 23. The system of any one of Aspects 14-22, wherein the fully convolutional network comprises a plurality of layers applying operations to one or more of the first image or the second image, and wherein the plurality of layers comprises one or more of a convolution layer, a deconvolution layer, a pooling layer, a normalization layer, an activation layer, or a multi-output regression layer.

Aspect 24. The system of any one of Aspects 14-23, wherein the fully convolutional network is not trained with training data before inputting one or more of the first image or the second image into the fully convolutional network.

Aspect 25. The system of any one of Aspects 14-24, wherein the computing device is further configured to determine a further updated fully convolutional network by further optimizing the similarity metric based on matching a third image to one or more of the first image, the second image, or a fourth image.

Aspect 26. The system of any one of Aspects 14-25, wherein determining the updated fully convolutional network by optimizing the similarity metric associated with spatially transforming the first image to match the second image comprises using a self-supervision process in which a processor uses an algorithm to adjust the one or more values of the fully convolutional network until a value of the similarity metric reaches a threshold value.

Aspect 27. A device, comprising, consisting of, or consisting essentially of: one or more processors; and memory storing instructions that, when executed by the one or more processors, cause the device to: input one or more of a first image or a second image into a fully convolutional network; determine an updated fully convolutional network by optimizing a similarity metric associated with spatially transforming the first image to match the second image, wherein one or more values of the fully convolutional network are adjusted to optimize the similarity metric; and register one or more of the first image or the second image based on the updated fully convolutional network.

Aspect 28. The system of Aspect 27, wherein the fully convolutional network is configured to apply a displacement field for registering the first image and the second image on one or more of a voxel-by-voxel or a pixel-by-pixel basis.

Aspect 29. The system of any one of Aspects 27-28, wherein the first image is based on a first imaging modality and the second image is based on a second imaging modality different than the first imaging modality.

Aspect 30. The system of any one of Aspects 27-29, wherein the first image comprises a magnetic resonance imaging (MRI) scan image and the second image comprises a computed tomography (CT) scan image.

Aspect 31. The system of any one of Aspects 27-30, wherein the first image represents a first object of interest and the second image represents a second object of interest.

Aspect 32. The system of claim 31, wherein the first object of interest is associated with a first patient and the second object of interest is associated with a second patient.

Aspect 33. The system of any one of Aspects 27-32, wherein the first image represents a first object of interest associated with a first time and the second image represents the first object of interest associated with a second time different than the first time.

Aspect 34. The system of any one of Aspects 27-33, wherein registering one or more of first image or the second image based on the updated fully convolutional network comprises spatially transforming the first image to at least partially match the second image.

Aspect 35. The system of any one of Aspects 27-34, wherein the one or more values of the fully convolutional network comprise one or more of a kernel size or a stride of one or more layers of the fully convolutional network.

Aspect 36. The system of any one of Aspects 27-35, wherein the fully convolutional network comprises a plurality of layers applying operations to one or more of the first image or the second image, and wherein the plurality of layers comprises one or more of a convolution layer, a deconvolution layer, a pooling layer, a normalization layer, an activation layer, or a multi-output regression layer.

Aspect 37. The system of any one of Aspects 27-36, wherein the fully convolutional network is not trained with training data before inputting one or more of the first image or the second image into the fully convolutional network.

Aspect 38. The system of any one of Aspects 27-37, wherein the instructions are further configured to cause the device to determine a further updated fully convolutional network by further optimizing the similarity metric based on matching a third image to one or more of the first image, the second image, or a fourth image.

Aspect 39. The system of any one of Aspects 27-38, wherein determining the updated fully convolutional network by optimizing the similarity metric associated with spatially transforming the first image to match the second image comprises using a self-supervision process in which a processor uses an algorithm to adjust the one or more values of the fully convolutional network until a value of the similarity metric reaches a threshold value.

Figure 5:
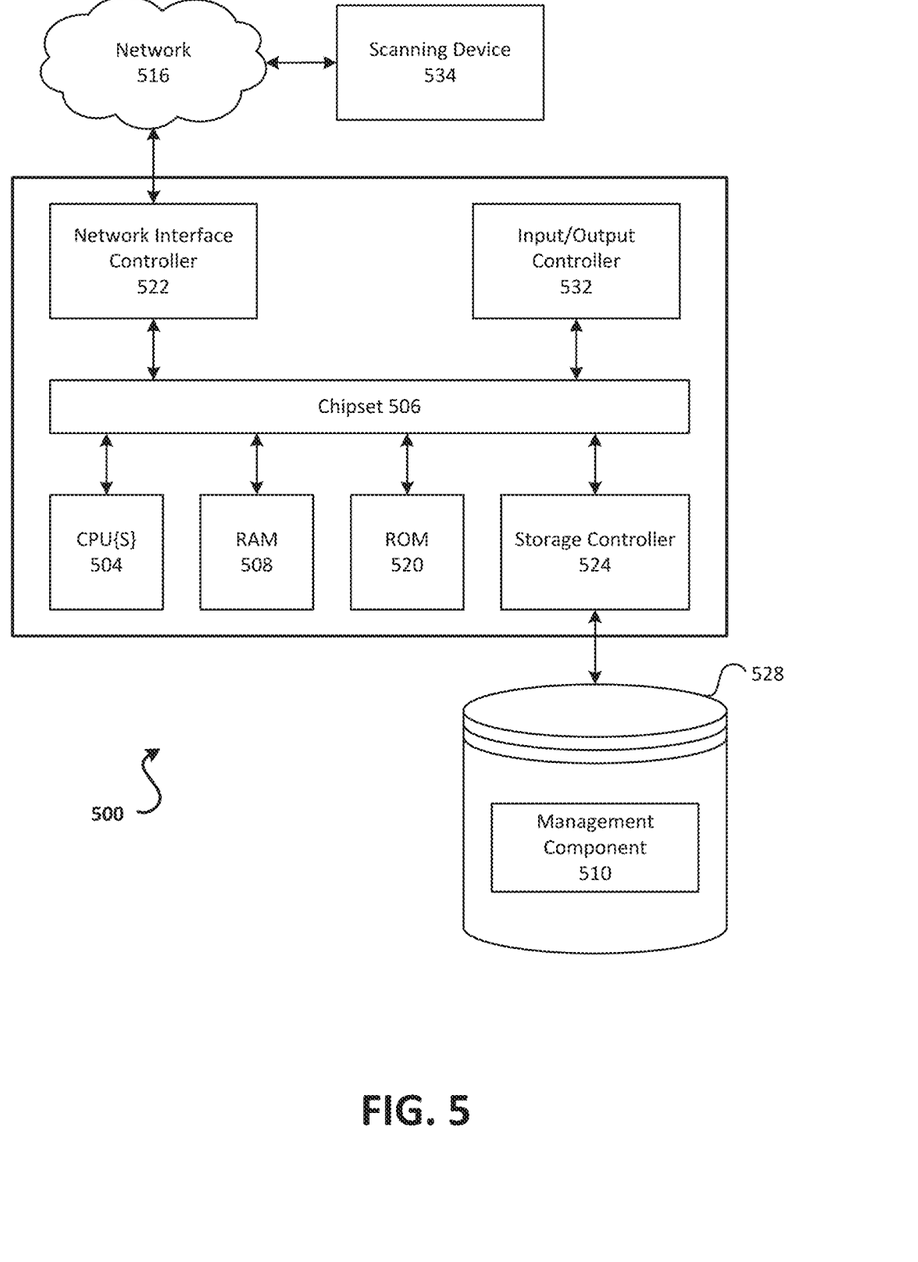
FIG. 5 is a block diagram illustrating an example computing device.

FIG. 5 depicts a computing device that may be used in various aspects, such as to implement the methods, systems, and architectures described herein. The computer architecture shown in FIG. 5 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 1-4.

The computing device 500 may include a baseboard, or "motherboard," which is a printed circuit board to which a multitude of components or devices may be connected by way of a system bus or other electrical communication paths. One or more central processing units (CPUs) 504 may operate in conjunction with a chipset 506. The CPU(s) 504 may be standard programmable processors that perform arithmetic and logical operations necessary for the operation of the computing device 500.

The CPU(s) 504 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 504 may be augmented with or replaced by other processing units, such as GPU(s) 505. The GPU(s) 505 may comprise processing units specialized for but not necessarily limited to highly parallel computations, such as graphics and other visualization-related processing.

A chipset 506 may provide an interface between the CPU(s) 504 and the remainder of the components and devices on the baseboard. The chipset 506 may provide an interface to a random access memory (RAM) 508 used as the main memory in the computing device 500. The chipset 506 may further provide an interface to a computer-readable storage medium, such as a read-only memory (ROM) 520 or non-volatile RAM (NVRAM) (not shown), for storing basic routines that may help to start up the computing device 500 and to transfer information between the various components and devices. ROM 520 or NVRAM may also store other software components necessary for the operation of the computing device 500 in accordance with the aspects described herein.

The computing device 500 may operate in a networked environment using logical connections to remote computing nodes and computer systems through local area network (LAN) 516. The chipset 506 may include functionality for providing network connectivity through a network interface controller (NIC) 522, such as a gigabit Ethernet adapter. A NIC 522 may be capable of connecting the computing device 500 to other computing nodes over a network 516. It should be appreciated that multiple NICs 522 may be present in the computing device 500, connecting the computing device to other types of networks and remote computer systems.

The computing device 500 may be connected to a mass storage device 528 that provides non-volatile storage for the computer. The mass storage device 528 may store system programs, application programs, other program modules, and data, which have been described in greater detail herein. The mass storage device 528 may be connected to the computing device 500 through a storage controller 524 connected to the chipset 506. The mass storage device 528 may consist of one or more physical storage units. A storage controller 524 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 500 may store data on a mass storage device 528 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 528 is characterized as primary or secondary storage and the like.

For example, the computing device 500 may store information to the mass storage device 528 by issuing instructions through a storage controller 524 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 500 may further read information from the mass storage device 528 by detecting the physical states or characteristics of one or more particular locations within the physical storage units.

In addition to the mass storage device 528 described above, the computing device 500 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 500.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 528 depicted in FIG. 5, may store an operating system utilized to control the operation of the computing device 500. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 528 may store other system or application programs and data utilized by the computing device 500.

The mass storage device 528 or other computer-readable storage media may also be encoded with computer-executable instructions, which, when loaded into the computing device 500, transforms the computing device from a general-purpose computing system into a special-purpose computer capable of implementing the aspects described herein. These computer-executable instructions transform the computing device 500 by specifying how the CPU(s) 504 transition between states, as described above. The computing device 500 may have access to computer-readable storage media storing computer-executable instructions, which, when executed by the computing device 500, may perform the methods described in relation to FIGS. 1-4.

A computing device, such as the computing device 500 depicted in FIG. 5, may also include an input/output controller 532 for receiving and processing input from a number of input devices, such as a keyboard, a mouse, a touchpad, a touch screen, an electronic stylus, or other type of input device. Similarly, an input/output controller 532 may provide output to a display, such as a computer monitor, a flat-panel display, a digital projector, a printer, a plotter, or other type of output device. It will be appreciated that the computing device 500 may not include all of the components shown in FIG. 5, may include other components that are not explicitly shown in FIG. 5, or may utilize an architecture completely different than that shown in FIG. 5.

As described herein, a computing device may be a physical computing device, such as the computing device 500 of FIG. 5. A computing node may also include a virtual machine host process and one or more virtual machine instances. Computer-executable instructions may be executed by the physical hardware of a computing device indirectly through interpretation and/or execution of instructions stored and executed in the context of a virtual machine.

The computing device 500 may receive image data via the network 516. For example, a scanning device 534 may be configured to generate image data by scanning one or more objects of interest. The scanning device 534 may comprise a MRI device, a CT device, an x-ray device, a camera, and/or the like. The image data may be received and processed by the management component 510, which may be configured to process the image data based on the disclosed methods and techniques. For example, the image data may be registered using the disclosed methods and techniques. The registered image data may be sent to another device, such as a user device, and/or may be displayed via a monitor.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

REFERENCES

[1] A. Sotiras, et al., "Deformable Medical Image Registration: A Survey," Ieee Transactions on Medical Imaging, vol. 32, pp. 1153-1190, July 2013.
[2] J. Krebs, et al., "Robust non-rigid registration through agent-based action learning," in Medical Image Computing and Computer Assisted Interventions (MICCAI), 2017.
[3] M.-M. Rohé, et al., "SVF-Net: Learning Deformable Image Registration Using Shape Matching," in MICCAI 2017—the 20th International Conference on Medical Image Computing and Computer Assisted Intervention, 2017.
[4] X. Yang, et al., "Quicksilver: Fast predictive image registration—A deep learning approach," Neuroimage, vol. 158, pp. 378-396, Jul. 11, 2017.
[5] G. Wu, et al., "Scalable High-Performance Image Registration Framework by Unsupervised Deep Feature Representations Learning," IEEE Trans Biomed Eng, vol. 63, pp. 1505-16, July 2016.
[6] M. Jaderberg, et al., "Spatial transformer networks," in Advances in Neural Information Processing Systems, 2015, pp. 2017-2025.

[7] H. Sokooti, et al., "Nonrigid Image Registration Using Multi-Scale 3D Convolutional Neural Networks," in Medical Image Computing and Computer-Assisted Intervention, Quebec, Canada, 2017.
[8] I. Yoo, et al., "ssEMnet: Serial-section Electron Microscopy Image Registration using a Spatial Transformer Network with Learned Features," arXiv preprint arXiv: 1707.07833, 2017.
[9] J. Long, et al., "Fully convolutional networks for semantic segmentation," in Proceedings of the IEEE Conference on Computer Vision and Pattern Recognition, 2015, pp. 3431-3440.
[10] V. Vishnevskiy, et al., "Isotropic Total Variation Regularization of Displacements in Parametric Image Registration," IEEE Trans Med Imaging, vol. 36, pp. 385-395, February 2017.
[11] L. Chen-Yu, et al., "Deeply-supervised nets," CoRR, abs/1409.5185, vol. 3, p. 93, 2014.
[12] M. Abadi, et al., "TensorFlow: A System for Large-Scale Machine Learning."
[13] Y. Hao, et al., "Local label learning (LLL) for subcortical structure segmentation: Application to hippocampus segmentation," Human brain mapping, vol. 35, pp. 2674-2697, 2014.
[14] M. Boccardi, et al., "Training labels for hippocampal segmentation based on the EADC-ADNI harmonized hippocampal protocol," Alzheimers & Dementia, vol. 11, pp. 175-183, February 2015.
[15] D. W. Shattuck, et al., "Construction of a 3D probabilistic atlas of human cortical structures," Neuroimage, vol. 39, pp. 1064-80, Feb. 1, 2008.
[16] B. B. Avants, et al., "A reproducible evaluation of ANTs similarity metric performance in brain image registration," Neuroimage, vol. 54, pp. 2033-44, Feb. 1, 2011.

What is claimed:

1. A method, comprising:
inputting a first image and a second image into a fully convolutional network;
determining an updated fully convolutional network by applying a displacement field for registering the first image and the second image on one or more of a voxel-by-voxel or a pixel-by-pixel basis, and optimizing a similarity metric associated with spatially transforming the first image to match the second image, wherein the similarity metric is a measure of similarity between at least the spatially transformed first image and the second image, and wherein one or more values of the fully convolutional network are adjusted to optimize the similarity metric; and
registering one or more of the first image or the second image based on the updated fully convolutional network.

2. The method of claim 1, wherein the first image is based on a first imaging modality and the second image is based on a second imaging modality different than the first imaging modality.

3. The method of claim 1, wherein the first image comprises a magnetic resonance imaging (MRI) scan image and the second image comprises a computed tomography (CT) scan image.

4. The method of claim 1, wherein the first image represents a first object of interest and the second image represents a second object of interest.

5. The method of claim 4, wherein the first object of interest is associated with a first patient and the second object of interest is associated with a second patient.

6. The method of claim 1, wherein the first image represents a first object of interest associated with a first time and the second image represents the first object of interest associated with a second time different than the first time.

7. The method of claim 1, wherein registering one or more of first image or the second image based on the updated fully convolutional network comprises spatially transforming the first image to at least partially match the second image.

8. The method of claim 1, wherein the one or more values of the fully convolutional network comprise one or more of a kernel size or a stride of one or more layers of the fully convolutional network.

9. The method of claim 1, wherein the fully convolutional network comprises a plurality of layers applying operations to one or more of the first image or the second image, and wherein the plurality of layers comprises one or more of a convolution layer, a deconvolution layer, a pooling layer, a normalization layer, an activation layer, or a multi-output regression layer.

10. The method of claim 1, wherein the fully convolutional network is not trained with training data before inputting the first image and the second image into the fully convolutional network.

11. The method of claim 1, further comprising:
determining a further updated fully convolutional network by further optimizing the similarity metric based on matching a third image to one or more of the first image, the second image, or a fourth image.

12. The method of claim 1, wherein determining the updated fully convolutional network by optimizing the similarity metric associated with spatially transforming the first image to match the second image comprises using a self-supervision process in which a processor uses an algorithm to adjust the one or more values of the fully convolutional network until a value of the similarity metric reaches a threshold value.

13. A system, comprising:
a scanning device configured to generate a first image of an object of interest; and
a computing device configured to:
receive the first image;
input the first image and a second image into a fully convolutional network;
determine an updated fully convolutional network by applying a displacement field for registering the first image and the second image on one or more of a voxel-by-voxel or a pixel-by-pixel basis, and optimizing a similarity metric associated with spatially transforming the first image to match the second image, wherein the similarity metric is a measure of similarity between at least the spatially transformed first image and the second image, and wherein one or more values of the fully convolutional network are adjusted to optimize the similarity metric; and
register one or more of the first image or the second image based on the updated fully convolutional network.

14. The system of claim 13, wherein the first image is based on a first imaging modality and the second image is based on a second imaging modality different than the first imaging modality.

15. The system of claim 13, wherein the fully convolutional network is not trained with training data before inputting the first image and the second image into the fully convolutional network.

16. The system of claim 13, wherein the computing device is configured to determine the updated fully convolutional network by optimizing the similarity metric associated with spatially transforming the first image to match the second image comprises using a self-supervision process in which a processor uses an algorithm to adjust the one or more values of the fully convolutional network until a value of the similarity metric reaches a threshold value.

17. A device, comprising:
one or more processors; and
memory storing instructions that, when executed by the one or more processors, cause the device to:
input a first image and a second image into a fully convolutional network;
determine an updated fully convolutional network by applying a displacement field for registering the first image and the second image on one or more of a voxel-by-voxel or a pixel-by-pixel basis, and optimizing a similarity metric associated with spatially transforming the first image to match the second image, wherein the similarity metric is a measure of similarity between at least the spatially transformed first image and the second image, and wherein one or more values of the fully convolutional network are adjusted to optimize the similarity metric; and
register one or more of the first image or the second image based on the updated fully convolutional network.

18. The device of claim 17, wherein the fully convolutional network is not trained with training data before inputting the first image and the second image into the fully convolutional network.

19. The device of claim 17, wherein the instructions cause the device to determine the updated fully convolutional network by optimizing the similarity metric associated with spatially transforming the first image to match the second image comprises using a self-supervision process in which a processor uses an algorithm to adjust the one or more values of the fully convolutional network until a value of the similarity metric reaches a threshold value.

* * * * *

UNITED STATES PATENT AND TRADEMARK OFFICE
CERTIFICATE OF CORRECTION

| | |
|---|---|
| PATENT NO. | : 11,348,227 B2 |
| APPLICATION NO. | : 16/560235 |
| DATED | : May 31, 2022 |
| INVENTOR(S) | : Yong Fan et al. |

It is certified that error appears in the above-identified patent and that said Letters Patent is hereby corrected as shown below:

On the Title Page

Page 3, under item (56), Other Publications,
Column No. 2, Line 42, Replace:
"al. Eady detection"
With:
-- al. Early detection --

In the Specification

Under Column No. 4, Line 16, Replace:
"If, (Dv ∘ v)"
With:
-- If, (Dv(v)) --

Signed and Sealed this
Twenty-fifth Day of February, 2025

Coke Morgan Stewart
*Acting Director of the United States Patent and Trademark Office*